(12) United States Patent
Freire Teiga (10) Patent No.: US 7,073,527 B1
(45) Date of Patent: Jul. 11, 2006

(54) ASSIGNABLE PRESSURE GOVERNOR VALVE

(76) Inventor: Jose M Freire Teiga, Urb. Alta Vista Res. Los Raudales III, Apt. #S1-6, Puerto Ordaz (VE)

( * ) Notice: Subject to any disclaimer, the term of this patent is extended or adjusted under 35 U.S.C. 154(b) by 178 days.

(21) Appl. No.: 10/735,887

(22) Filed: Dec. 15, 2003

(51) Int. Cl.
F16K 15/20 (2006.01)
(52) U.S. Cl. .................. 137/226; 137/228; 137/493.4
(58) Field of Classification Search .............. 137/226, 137/228, 493.4
See application file for complete search history.

(56) References Cited

U.S. PATENT DOCUMENTS

| | | | | |
|---|---|---|---|---|
| 1,053,623 | A | * | 2/1913 | McMillion .................. 137/226 |
| 1,137,209 | A | * | 4/1915 | Henemier ................... 137/226 |
| 1,139,290 | A | * | 5/1915 | Jaquish ........................ 137/226 |
| 1,156,328 | A | * | 10/1915 | Thayer ........................ 137/226 |
| 1,467,440 | A | * | 9/1923 | Lumb .......................... 137/226 |
| 1,488,813 | A | * | 4/1924 | Hagen et al. ................ 137/226 |
| 2,017,978 | A | * | 10/1935 | Lapp ............................ 137/226 |
| 2,552,666 | A | * | 5/1951 | Cox ............................. 137/226 |
| 2,954,796 | A | * | 10/1960 | Marshall ...................... 137/226 |
| 3,426,787 | A | * | 2/1969 | Fuller ........................... 137/226 |
| 3,450,147 | A | * | 6/1969 | Webb .......................... 137/226 |
| 3,631,886 | A | * | 1/1972 | Heiden ..................... 137/493.6 |
| 3,719,198 | A | * | 3/1973 | Wilhelm et al. ............ 137/228 |
| 4,015,623 | A | | 4/1977 | Wanstreet |
| 4,805,681 | A | | 2/1989 | Vollmer et al. |
| 5,029,604 | A | | 7/1991 | Spector et al. |
| 5,054,511 | A | | 10/1991 | Tuan et al. |
| 5,694,969 | A | | 12/1997 | DeVuyst |
| 6,142,168 | A | | 11/2000 | Sumrall |
| 6,302,138 | B1 | | 10/2001 | Sumrall |

* cited by examiner

*Primary Examiner*—Eric Keasel
*Assistant Examiner*—Craig Price
(74) *Attorney, Agent, or Firm*—Michael I Kroll (57) ABSTRACT

In an apparatus for regulating the internal pressure of a closed system, a valve housing connected to a closed system, an intake valve connected to a valve housing for receiving a pressurized substance in one direction through the valve housing into the closed system, and a release valve connected to the valve housing for releasing excess pressure from the closed system. The release valve has a release valve aperture for releasing pressurized substance, a release valve block for selectively preventing the pressurized substance from escaping through the release valve aperture, and a release valve spring for retaining the release valve block in a closed position. When the constant internal pressure is increased, the release valve spring causes the release valve block to move from the closed position to an open position, thereby allowing excess pressurized substance to escape from the release valve aperture.

6 Claims, 11 Drawing Sheets

ASSIGNABLE PRESSURE GOVERNOR VALVE

BACKGROUND OF THE INVENTION

1. Field of the Invention

The present invention relates generally to valves and, more specifically, to a governor valve for preventing over-pressurization of a closed system. The governor valve includes a one-way intake valve for increasing the pressure within a closed system. The governor valve also incorporates a release valve having means for assigning a desired maximum pressure. When the closed system is pressurized to the level equal to the desired maximum pressure, the release valve will open, thereby preventing over-pressurization of the closed system beyond the desired maximum pressure. In addition, the user may elect to reduce the pressure by manipulating the release valve to a lower desired maximum pressure, thereby causing the release valve to open and release air until the new desired maximum pressure is reached.

2. Description of the Prior Art

There are other tire valves designed for regulating pressure. Typical of these are U.S. Pat. Nos. 4,015,623, 4,805,681, 5,029,604, 5,054,511, 5,694,969, 6,142,168, and 6,302,138. While these inventions may be suitable for the purposes for which they were designed, they would not be as suitable for the purposes of the present invention, as hereinafter described.

U.S. Pat. No. 4,015,623

Inventor: Gregory E. Wanstreet

Issued: Apr. 5, 1977

A valve assembly having a pair of flow passages in fluid communication with a chamber leading to a tire. One of the passages contains a typical one-way valve core mechanism while the other passage contains a pressure release mechanism. The cross sectional area of the tire inflation passage is less than the cross sectional area of the passage leading from the chamber to the pressure release bore. The exhaust port has a closure means which opens simultaneously with the pressure release mechanism. The closure means offers resistance to escaping inflation fluid which serves to urge the pressure release mechanism open against the biasing force of spring means urging it closed.

U.S. Pat. No. 4,805,681

Inventor: Karl Vollmer et al.

Issued: Feb. 21, 1989

A control valve for increasing or reducing the air pressure in a tire of a vehicle wheel that is to be carried out over a short period of time, has a valve chamber that is connected, on one side, to the interior of the tire and, on the other side, to a supply duct. The valve chamber has a space that extends axially through the wheel hub, the interior end of this space being sealed off with respect to an axle part carrying the vehicle wheel. In this space, an automatically closing valve member is arranged that can be controlled into its open position against the interior pressure of the tire by a control piston that is also guided in this space and can be acted upon by a pressure medium. For supplying air to and removing air from the tire, the axle part projects into an axial duct of the control piston with a cylindrical projection that is penetrated by the supply duct. For the opening of the control valve for the removal of air and, if necessary, also for supplying air to the tire, the pressure medium is supplied via a supply duct provided in the axle part and leading out into an intermediate space located between the axle part and the control piston.

U.S. Pat. No. 5,029,604

Inventor: Semyon Spektor et al.

Issued: Jul. 9, 1991

A safety core (10) for a tire valve comprises a head portion (12) screwed into the valve's housing (28) so that it is sealed against the inner wall of the housing by compressing a seal ring (36) located in an annular groove (34) formed in a tapered portion (32) of the head part. Inserted into the head part is a cylindrical body (14) which contains a ball-type check valve (20). A ball (84) of the valve is constantly pressed to a seat (80) installed on the rear end of an adjustment pipe (16), the latter being screwed into the rear end of the body (14). The rear end protrudes through the head portion (12) and has a stop (58) on its end. A spring (62), located between the stop (58) and the outer end face of the head portion (12), constantly urges the front end of the head portion (12) to a valve seat formed on a shoulder (68) of a large-diameter portion (66) of the cylindrical body. A spring (86), which keeps the check valve normally in a closed state, is adjusted to a predetermined maximum allowable pressure of the tire. When this pressure is exceeded, e.g., because of an extraordinary load, sustained high-speed drawing, or high temperature, the air in the tire opens the check valve and is released through gaps in the safety core.

U.S. Pat. No. 5,054,511

Inventor: C. T. Tuan et al.

Issued: Oct. 8, 1991

A tire valve is disclosed which includes an automatic pressure releasing device and comprises an inlet assembly and an outlet assembly. The inlet assembly includes a valve pole biased closed by a spring to allow air input. The valve includes an inlet/outlet assembly which has an inlet valve room and a pressure release room. These rooms utilize ball valves and springs to control the air flow. A pressure releasing device is provided and comprises an adjusting screw, a spring and a ball valve. The pressure releasing device will function when the tire air pressure exceeds a specified range, so as to ensure proper air pressure in the tire.

U.S. Pat. No. 5,694,969

Inventor: Christopher De Vuyst

Issued: Dec. 9, 1997

A pressure relief tire valve for inflating a tire wheel assembly has a tire inflation valve body having a chamber therein with openings through the top and bottom ends thereof and having a relief opening formed in the tire valve body. An inflation valve having a spring loaded central core to allow to pass inward is located in the tire valve body adjacent the tire inflation valve body top end for inflating the tire therethrough. An overpressure valve is located in the tire valve body for releasing air from the tire when the air pressure in the tire exceeds a predetermined level. The overpressure valve has a valve seat and valve element biased against the valve element by a compression for maintaining the valve element in a closed position until the predetermined air pressure is reached in the tire and to allow the valve element to open to release air through the valve body relief opening when the air pressure in the tire and to allow the valve element to open to release air through the valve body relief opening when the air pressure in the tire exceeds the predetermined pressure. A heat variable bellows supports the compression spring and is responsive to changes in temperature of the air in the tire so that the overpressure valve can prevent overinflating the tire as well as loss of tire pressure upon an increase of air pressure in the tire from an increase in temperature of the air in the tire.

U.S. Pat. No. 6,142,168

Inventor: Dirk Lee Sumrall

Issued: Nov. 7, 2000

The present invention is related to air pressure valve stems and gauges. More particularly, this invention relates particularly to tire stem valves possessing a built-in calibrated air pressure regulator and an optional integrated air pressure indicator.

U.S. Pat. No. 6,302,138

Inventor: Dirk Lee Sumrall

Issued: May 3, 2000

The present invention is related to air pressure valve stems and gauges. More particularly, this invention relates particularly to tire stem valves possessing a built-in calibrated air pressure regulator and an optional integrated air pressure indicator.

SUMMARY OF THE PRESENT INVENTION

The present invention relates generally to valves and, more specifically, to a governor valve for preventing over-pressurization of a closed system. The governor valve includes a one-way intake valve for increasing the pressure within a closed system. The governor valve also incorporates a release valve having means for assigning a desired maximum pressure. When the closed system is pressurized to the level equal to the desired maximum pressure, the release valve will open, thereby preventing over-pressurization of the closed system beyond the desired maximum pressure. In addition, the user may elect to reduce the pressure by manipulating the release valve to a lower desired maximum pressure, thereby causing the release valve to open and release air until the new desired maximum pressure is reached.

A primary object of the present invention is to provide a governor valve for overcoming the shortcomings of the prior art A secondary object of the present invention is to provide a governor valve having means for measuring the internal pressure of a closed system.

Another object of the present invention is to provide a governor valve having indicia or graphics positioned on the exterior of the valve for indicating the internal pressure of the closed system.

Yet another object of the present invention is to provide a governor valve having an intake valve and a release valve in axial alignment.

Still yet another object of the present invention is to provide a governor valve having a means for regulating the internal pressure of the closed system.

A further object of the present invention is to provide a governor valve wherein the regulating means include springs connected to the intake valve and release valve.

Yet a further object of the present invention is to provide a governor valve wherein the release valve has selective means for assigning the desired maximum pressure of the closed system.

Still yet a further object of the present invention is to provide a governor valve wherein the regulating means engages a movable control element connected to the selective means.

Another object of the present invention is to provide a governor valve wherein the selective means threadedly engages the valve housing.

Still yet another object of the present invention is to provide a governor valve wherein the position of the selective means relative to the indicia or graphic positioned on the exterior of the valve indicates the desired maximum pressure of the closed system.

A further object of the present invention is to provide a governor valve wherein upon reaching the desired maximum pressure, the regulating means moves the intake valve to a substantially closed position.

Another object of the present invention is to provide a governor valve wherein upon exceeding the desired maximum pressure, the regulating means moves the release valve to an open position for releasing the excess pressure contained in the closed system.

Still another object of the present invention is to provide a governor valve simple and easy to use.

Still yet another object of the present invention is to provide a governor valve that is inexpensive to manufacture and use.

Additional objects of the present invention will appear as the description proceeds.

The present invention overcomes the shortcomings of the prior art by providing a governor valve for automatically regulating the internal pressure of a closed system to correspond to a user selected maximum pressure. The governor valve has an intake valve for receiving compressed air or liquid into a closed system and a release valve for regulating the internal pressure. As the pressure within the system exceeds a desired maximum pressure, the release valve will open thereby preventing over-pressurization of the system. Additionally, the internal pressure can be reduced by manipulating a selective means on the governor valve to correspond to a lower desired pressure thereby causing the release valve to open until the new desired pressure is reached.

The governor valve uses springs for measuring the internal pressure of the closed system and determining at what pressure the release valve will open (i.e., the desired maximum pressure). Taking into consideration pressure is equal to force divided by area ($P=F/A$), the spring force is determined as the spring constant K times the displacement of the spring; ($F=KX$). Using ($F=PA$) and ($F=KX$) then ($KX=PA$) with ($P=KX/A$) where area A is a constant and K is a constant, setting X obtains the pressure. Therefore, the springs measure the internal pressure of the system and are connected to the selective means so that adjustment of the selective means indicates desired maximum pressure. Once the selective means has been adjusted to the desired value, a source of pressure can be used to charge the closed system whereby over-pressurization of the system is prevented.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the governor valve of the present invention. With regard to the reference numerals used, the following numbering is used throughout the various drawing Figures.

| | |
|---|---|
| 2 | governor valve of the present invention |
| 3 | tire |
| 4 | cap |
| 6 | retainer nut |
| 8 | retainer nut aperture |
| 10 | setting nut |
| 12 | valve housing |
| 14 | graduated scale |
| 16 | source supply trigger pin |
| 18 | intake valve aperture |
| 20 | intake valve spring |
| 22 | intake valve block |
| 23 | release valve aperture |
| 24 | release valve spring |
| 26 | release valve block |

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
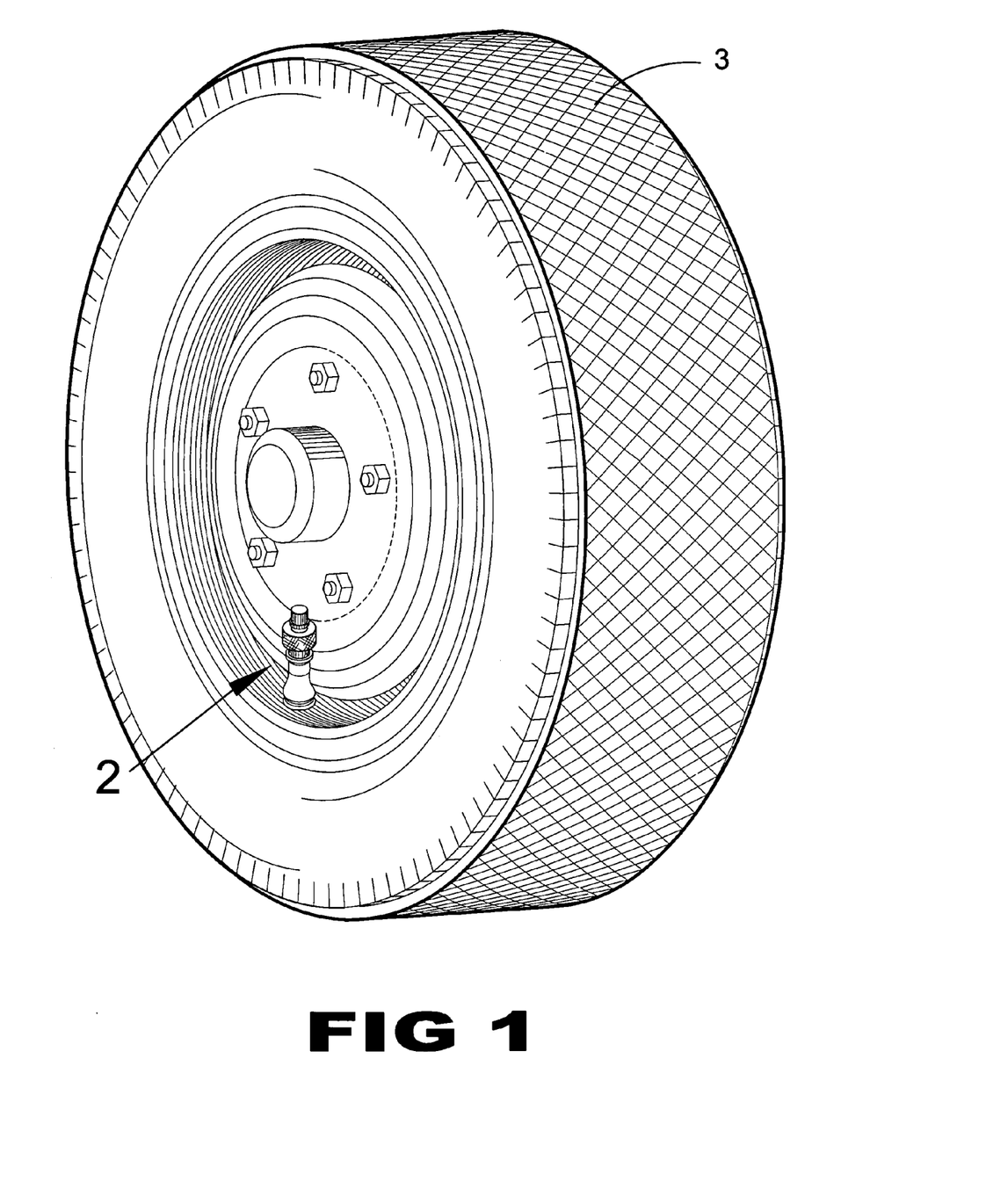
FIG. 1 is an illustrative view of the governor valve of the present invention.

FIG. 1 is an illustrative view of the governor valve of the present invention. A tire 3 is a closed system to which the governor valve 2 of the present invention is connected. The governor valve 2 incorporates an intake valve for receiving a pressurized substance and a release valve for releasing pressurized substance when the internal pressure of the closed system exceeds the user's desired maximum pressure, as shown in FIGS. 2–9.

Figure 2:
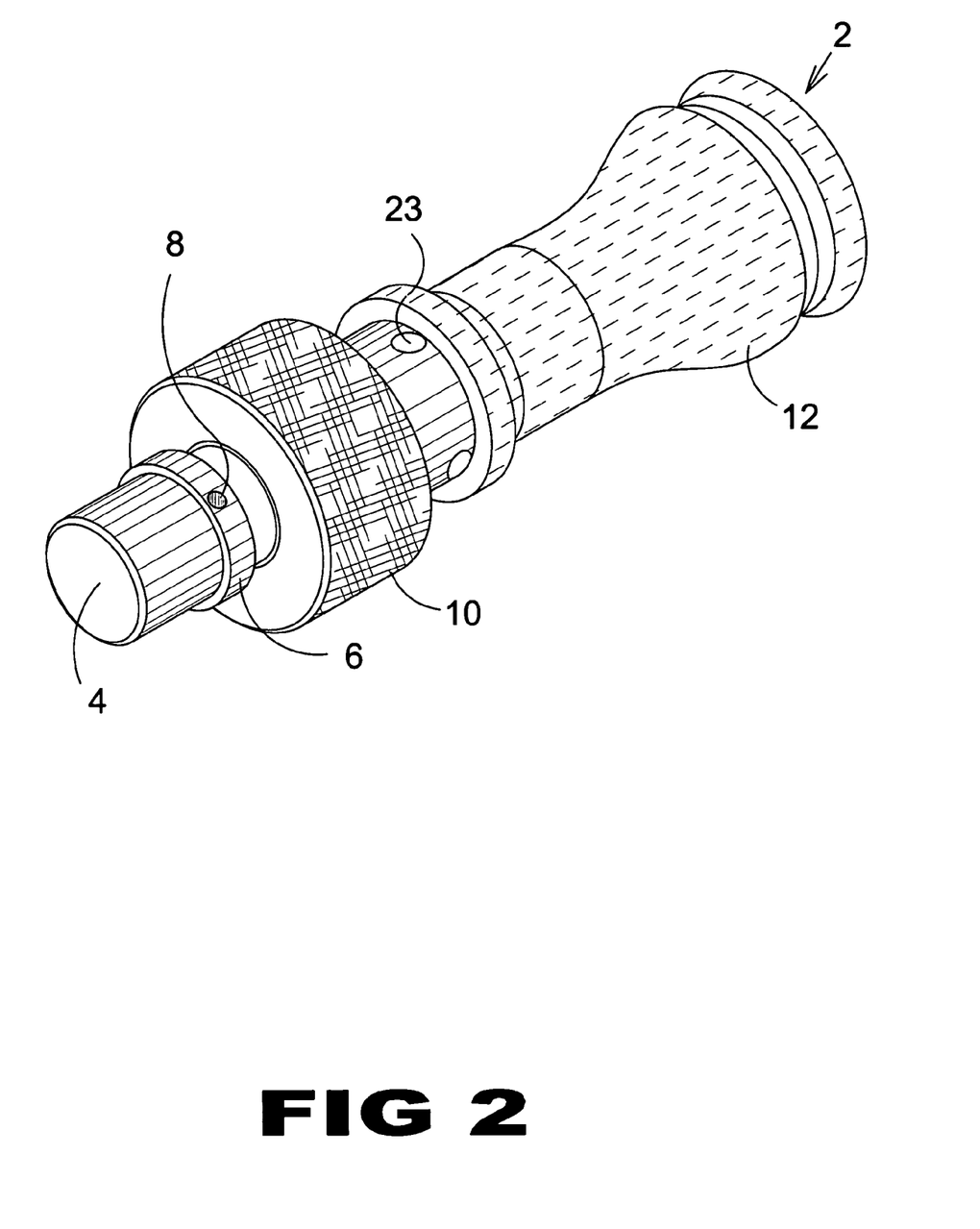
FIG. 2 is a perspective view of the governor valve of the present invention.

FIG. 2 is a perspective view of the governor valve of the present invention. The governor valve 2 includes an intake valve and a release valve connected to a valve housing 12. The intake valve includes an intake valve aperture 18, as shown in FIGS. 3–10, covered by a threadedly attached cap 4. The release valve includes release valve apertures 23 and a release valve spring 24 and release valve block 26, as shown in FIGS. 5–9. A setting nut 10 is attached to the valve housing 12 and the regulating means for adjusting the desired maximum pressure of the closed system. A retainer nut 6 is threadedly attached to the valve housing 12. The retainer nut 6 includes a retainer nut aperture 8 for rotating the retainer nut 6 with a small tool such as an Alan wrench in order to engage the retainer nut 6 with the setting nut 10, thereby retaining the setting nut 10 in a desired position.

Figure 3:
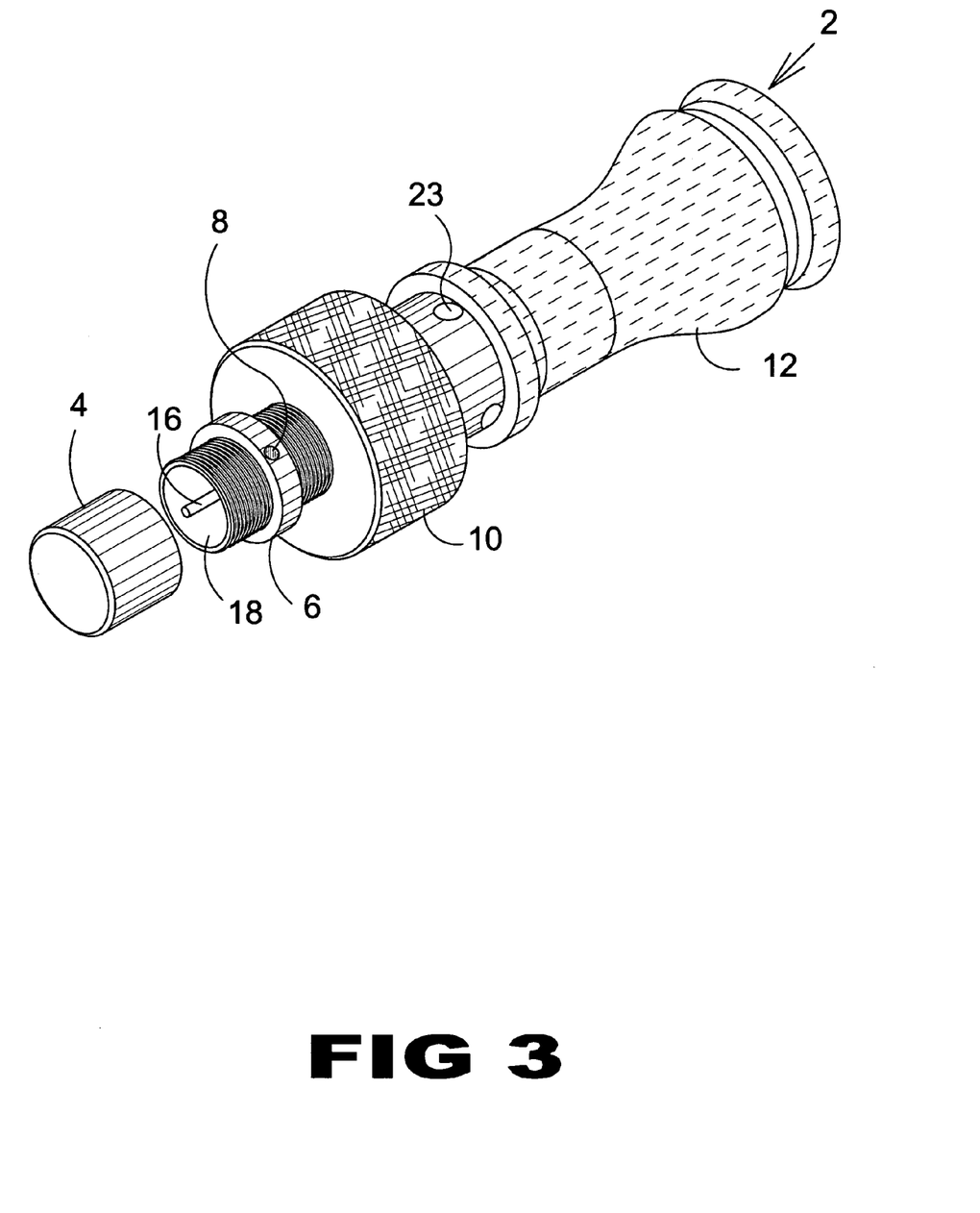
FIG. 3 is a perspective view of the governor valve of the present invention.

FIG. 3 is a perspective view of the present invention's pressure regulating valve. The governor valve 2 includes an intake valve and a release valve connected to a valve housing 12. The intake valve includes an intake valve aperture 18 covered by a threadedly attached cap 4. In FIG. 3, the cap 4 has been removed from the threaded exterior of the intake valve. Preferably, the intake valve includes a source supply trigger pin 16 which opens the intake valve thereby allowing pressurized substance to enter the system. The release valve includes release valve apertures 23 and a release valve spring 24 and release valve block 26, as shown in FIGS. 5–9. A setting nut 10 is attached to the valve housing 12 and the regulating means for adjusting the desired maximum pressure of the closed system. A retainer nut 6 is threadedly attached to the valve housing 12. The retainer nut 6 includes a retainer nut aperture 8 for rotating the retainer nut 6 with a small tool such as an Alan wrench in order to engage the retainer nut 6 with the setting nut 10, thereby retaining the setting nut 10 in a desired position.

Figure 4:
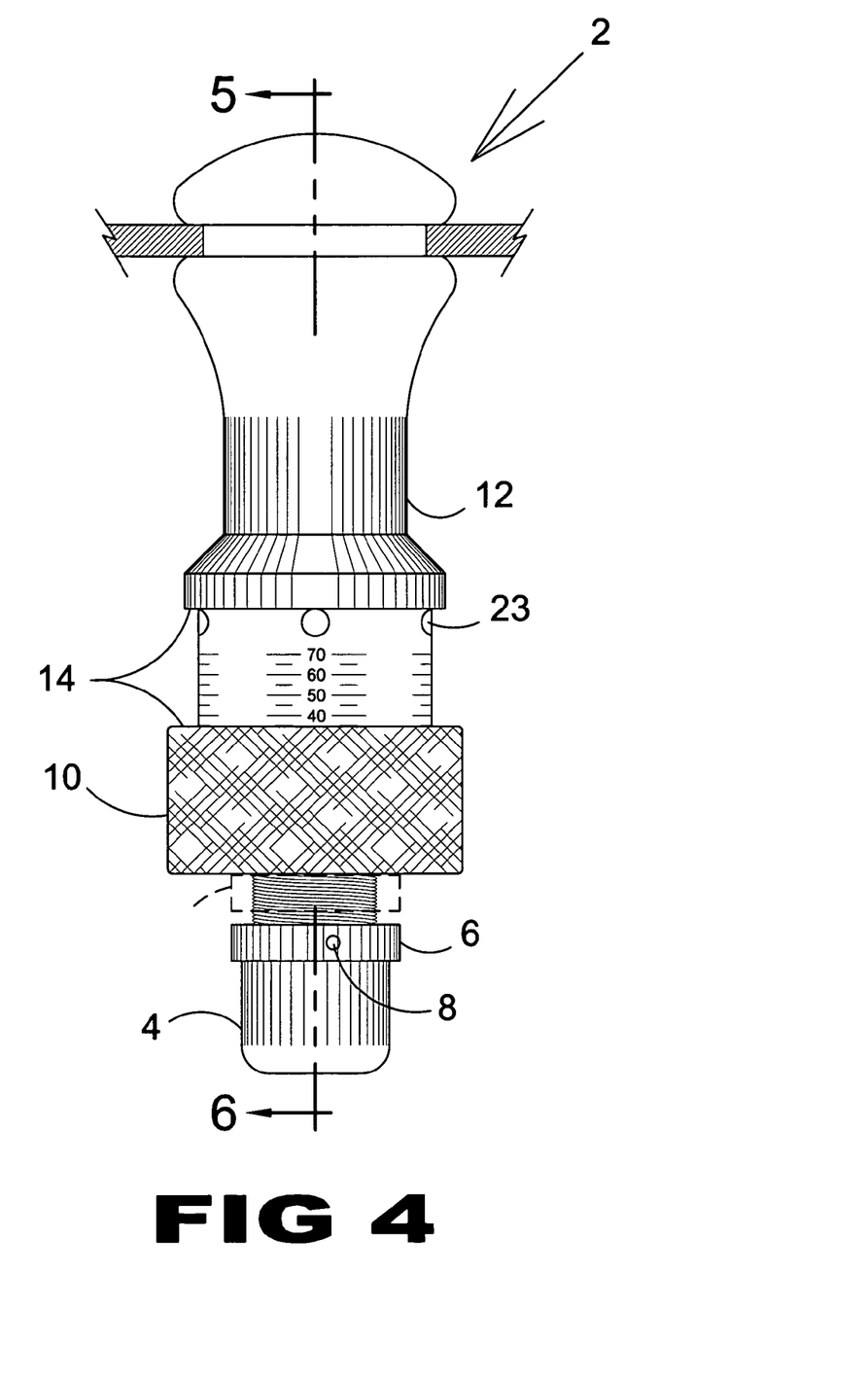
FIG. 4 is a side view of the governor valve of the present invention.

FIG. 4 is a side view of the present invention's pressure regulating valve. The governor valve 2 includes an intake valve and a release valve connected to a valve housing 12. The intake valve includes an intake valve aperture 18 covered by a threadedly attached cap 4. The release valve includes release valve apertures 23 and a release valve spring 24 and release valve block 26, as shown in FIGS. 5–9. A setting nut 10 is attached to the valve housing 12 and the regulating means for adjusting the desired maximum pressure of the closed system. The setting nut 10 indicates the internal pressure of the closed system as shown by the alignment of the setting nut 10 with a graduated scale 14 imprinted on the exterior of the governor valve 2. A retainer nut 6 is threadedly attached to the valve housing 12. The retainer nut 6 includes a retainer nut aperture 8 for rotating the retainer nut 6 with a small tool such as an Alan wrench in order to engage the retainer nut 6 with the setting nut 10, thereby retaining the setting nut 10 in a desired position.

Figure 5:
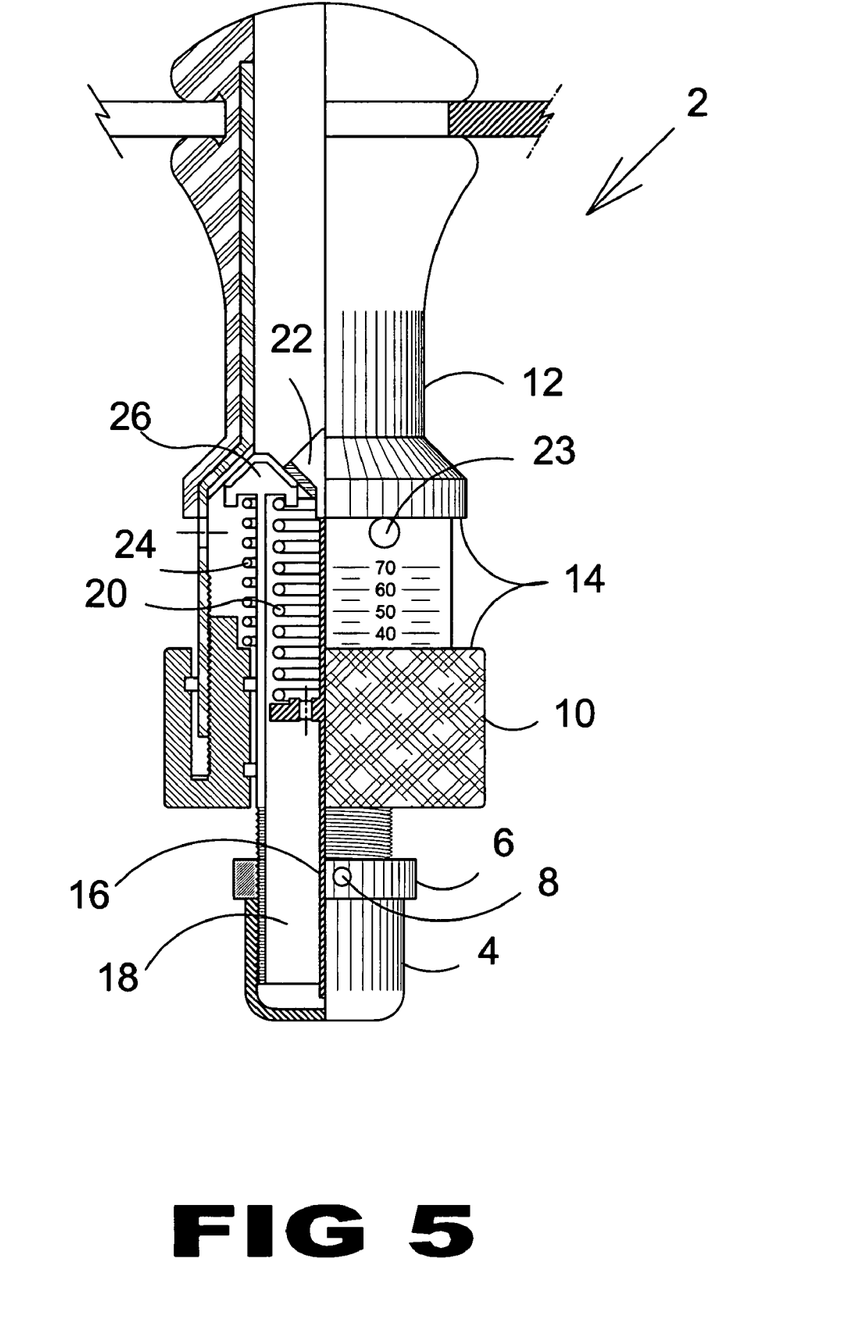
FIG. 5 is a sectional view of the governor valve of the present invention.

FIG. 5 is a sectional view of the present invention's pressure regulating valve. The governor valve 2 includes an intake valve and a release valve connected to a valve housing 12. The intake valve includes an intake valve aperture 18 covered by a threadedly attached cap 4. The intake valve further includes an intake valve spring 20 and an intake valve block 22. Preferably, the intake valve includes a source supply trigger pin 16 which pushes the intake valve block 22 against the force of the intake valve spring 20. The force of the intake valve block causes the intake valve spring 20 to be compressed thereby causing the intake valve to be in an open position. Upon the intake valve being in an open position, the closed system is able to receive air, which increases the internal pressure of the closed system. When the source supply trigger pin 16 is released, the intake valve spring 20 forces the intake valve block 22 to return to a closed position, thereby preventing the substance from entering or leaving the closed system 3 and keeping the pressure within the system 3 constant.

The release valve includes release valve apertures 23, a release valve spring 24, and release valve block 26. A setting nut 10 is attached to the valve housing 12 and the regulating means. The regulating means includes the release valve spring 24 and release valve block 26. When the user moves the setting nut 10, the release valve spring 24 is compressed. The release valve spring 24 is calibrated in accordance with the formula:

If $F=PA$ and $F=KX$, then $P=KX/A$ where

F=force, P=pressure, A=area, which is a constant, K=spring constant, and X=variable setting.

The setting nut 10 indicates the internal pressure of the closed system as shown by the alignment of the setting nut 10 with a graduated scale 14 imprinted on the exterior of the governor valve 2. The release valve spring 24 is calibrated so that if the internal pressure exceeds the desired maximum pressure, the release valve spring 24 causes the release valve block 26 to open. Upon the release valve block 26 being opened, excess pressurized substance escapes from the release valve apertures 23. When the internal pressure is equal to the desired maximum pressure, the release valve spring 24 causes the release valve block 26 to return to the closed position, thereby preventing pressurized substance from escaping through the release valve apertures 23.

A retainer nut 6 is threadedly attached to the valve housing 12. The retainer nut 6 includes a retainer nut aperture 8 for rotating the retainer nut 6 with a small tool such as an Alan wrench in order to engage the retainer nut 6 with the setting nut 10, thereby retaining the setting nut 10 in a desired position.

Figure 6:
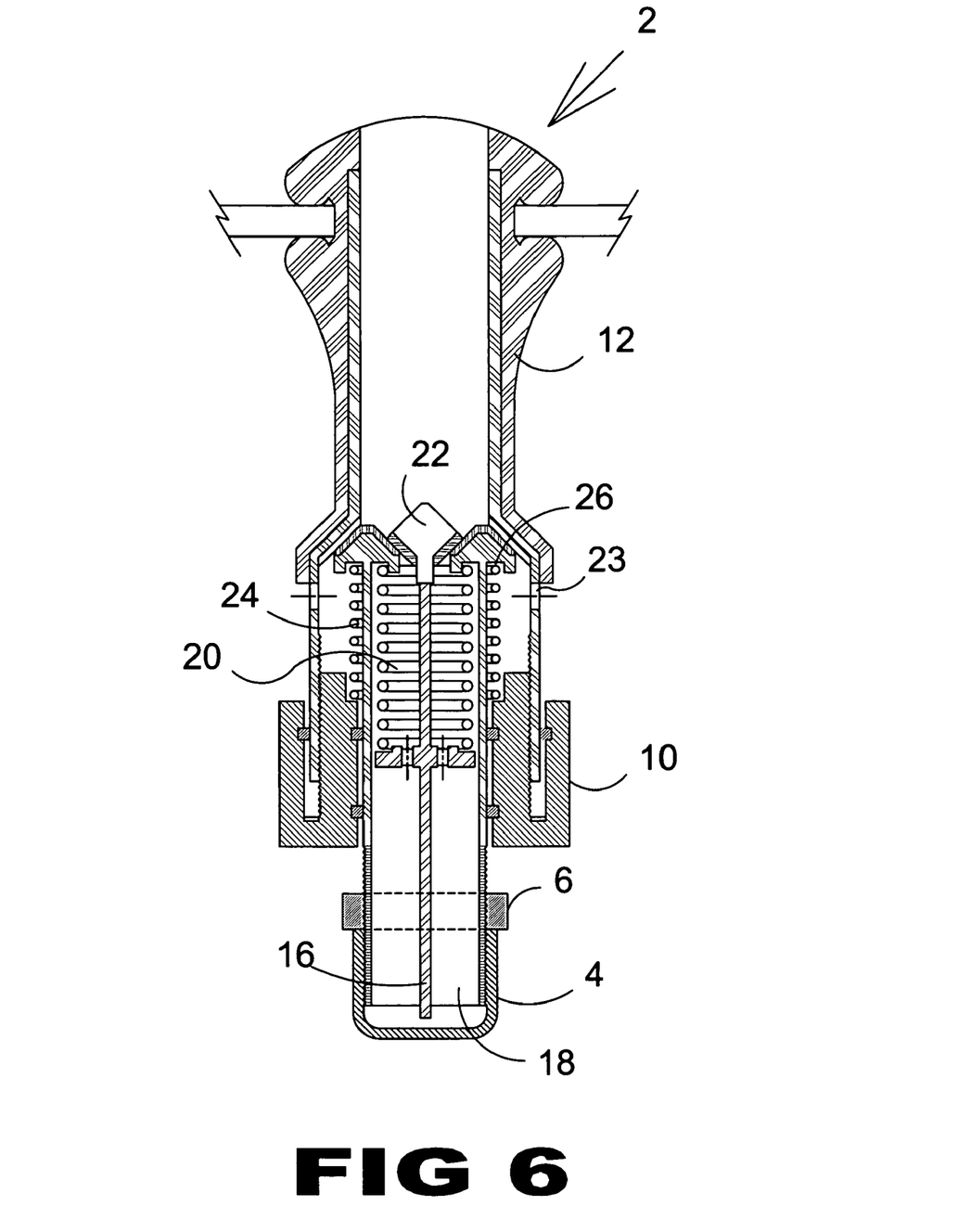
FIG. 6 is a sectional view of the governor valve of the present invention.

FIG. 6 is a sectional view of the present invention's pressure regulating valve. The governor valve 2 includes an intake valve and a release valve connected to a valve housing 12. The intake valve includes an intake valve aperture 18 covered by a threadedly attached cap 4. The intake valve further includes an intake valve spring 20 and an intake valve block 22. Preferably, the intake valve includes a source supply trigger pin 16 which pushes the intake valve block 22 against the force of the intake valve spring 20. The force of the intake valve block causes the intake valve spring 20 to be compressed thereby causing the intake valve to be in an open position. Upon the intake valve being in an open position, the closed system is able to receive air, which increases the internal pressure of the closed system. When the source supply trigger pin 16 is released, the intake valve spring 20 forces the intake valve block 22 to return to a closed position, thereby preventing the substance from entering or leaving the closed system 3 and keeping the pressure within the system 3 constant.

The release valve includes release valve apertures 23, a release valve spring 24, and release valve block 26. A setting nut 10 is attached to the valve housing 12 and the regulating means. The regulating means includes the release valve spring 24 and release valve block 26. When the user moves the setting nut 10, the release valve spring 24 is compressed. The release valve spring 24 is calibrated in accordance with the formula:

If $F=PA$ and $F=KX$, then $P=KX/A$ where

F=force, P=pressure, A=area, which is a constant, K=spring constant, and X=variable setting.

The setting nut 10 indicates the internal pressure of the closed system as shown by the alignment of the setting nut 10 with a graduated scale 14 imprinted on the exterior of the governor valve 2. The release valve spring 24 is calibrated so that if the internal pressure exceeds the desired maximum pressure, the release valve spring 24 causes the release valve block 26 to open. Upon the release valve block 26 being opened, excess pressurized substance escapes from the release valve apertures 23. When the internal pressure is equal to the desired maximum pressure, the release valve spring 24 causes the release valve block 26 to return to the closed position, thereby preventing pressurized substance from escaping through the release valve apertures 23.

A retainer nut 6 is threadedly attached to the valve housing 12. The retainer nut 6 includes a retainer nut aperture 8 for rotating the retainer nut 6 with a small tool such as an Alan wrench in order to engage the retainer nut 6 with the setting nut 10, thereby retaining the setting nut 10 in a desired position.

Figure 7:
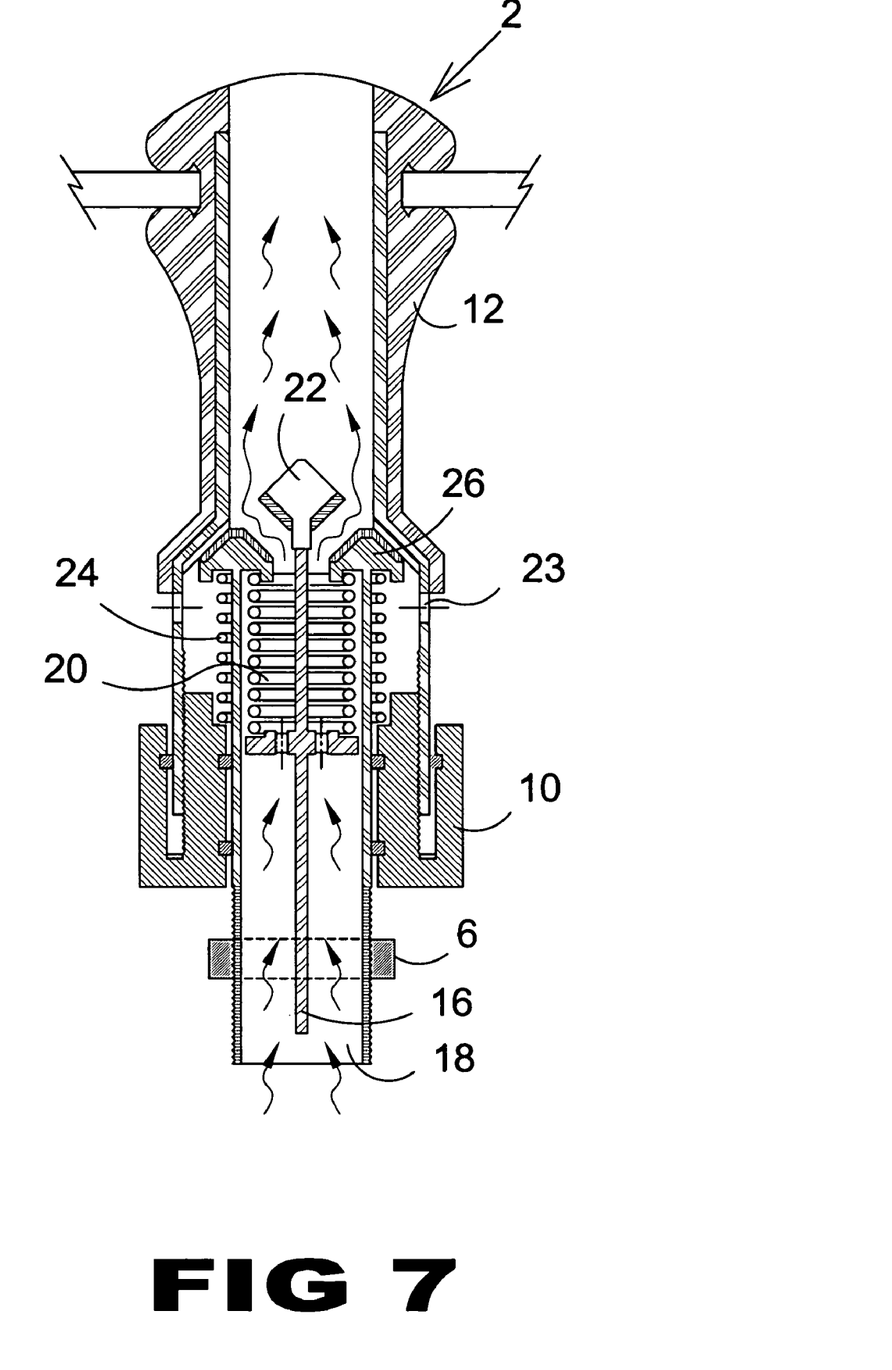
FIG. 7 is a sectional view of the governor valve of the present invention in use.

FIG. 7 is a sectional view of the present invention's pressure regulating valve in use. The governor valve 2 includes an intake valve and a release valve connected to a valve housing 12. The intake valve includes an intake valve aperture 18 covered by a threadedly attached cap 4. The intake valve further includes an intake valve spring 20 and an intake valve block 22. Preferably, the intake valve includes a source supply trigger pin 16 which pushes the intake valve block 22 against the force of the intake valve spring 20. The force of the intake valve block causes the intake valve spring 20 to be compressed thereby causing the intake valve to be in an open position. Upon the intake valve being in an open position, the closed system is able to receive air, which increases the internal pressure of the closed system. When the source supply trigger pin 16 is released, the intake valve spring 20 forces the intake valve block 22 to return to a closed position, thereby preventing the substance from entering or leaving the closed system 3 and keeping the pressure within the system 3 constant. FIG. 7 shows the intake valve in an open position, thereby allowing air to enter the system.

The release valve includes release valve apertures 23, a release valve spring 24, and release valve block 26. A setting nut 10 is attached to the valve housing 12 and the regulating means. The regulating means includes the release valve spring 24 and release valve block 26. When the user moves the setting nut 10, the release valve spring 24 is compressed. The release valve spring 24 is calibrated in accordance with the formula:

If F=PA and F=KX, then $P=KX/A$ where

F=force, P=pressure, A=area, which is a constant, K=spring constant, and X=variable setting.

The setting nut 10 indicates the internal pressure of the closed system as shown by the alignment of the setting nut 10 with a graduated scale 14 imprinted on the exterior of the governor valve 2. The release valve spring 24 is calibrated so that if the internal pressure exceeds the desired maximum pressure, the release valve spring 24 causes the release valve block 26 to open. Upon the release valve block 26 being opened, excess pressurized substance escapes from the release valve apertures 23. When the internal pressure is equal to the desired maximum pressure, the release valve spring 24 causes the release valve block 26 to return to the closed position, thereby preventing pressurized substance from escaping through the release valve apertures 23.

A retainer nut 6 is threadedly attached to the valve housing 12. The retainer nut 6 includes a retainer nut aperture 8 for rotating the retainer nut 6 with a small tool such as an Alan wrench in order to engage the retainer nut 6 with the setting nut 10, thereby retaining the setting nut 10 in a desired position.

Figure 8:
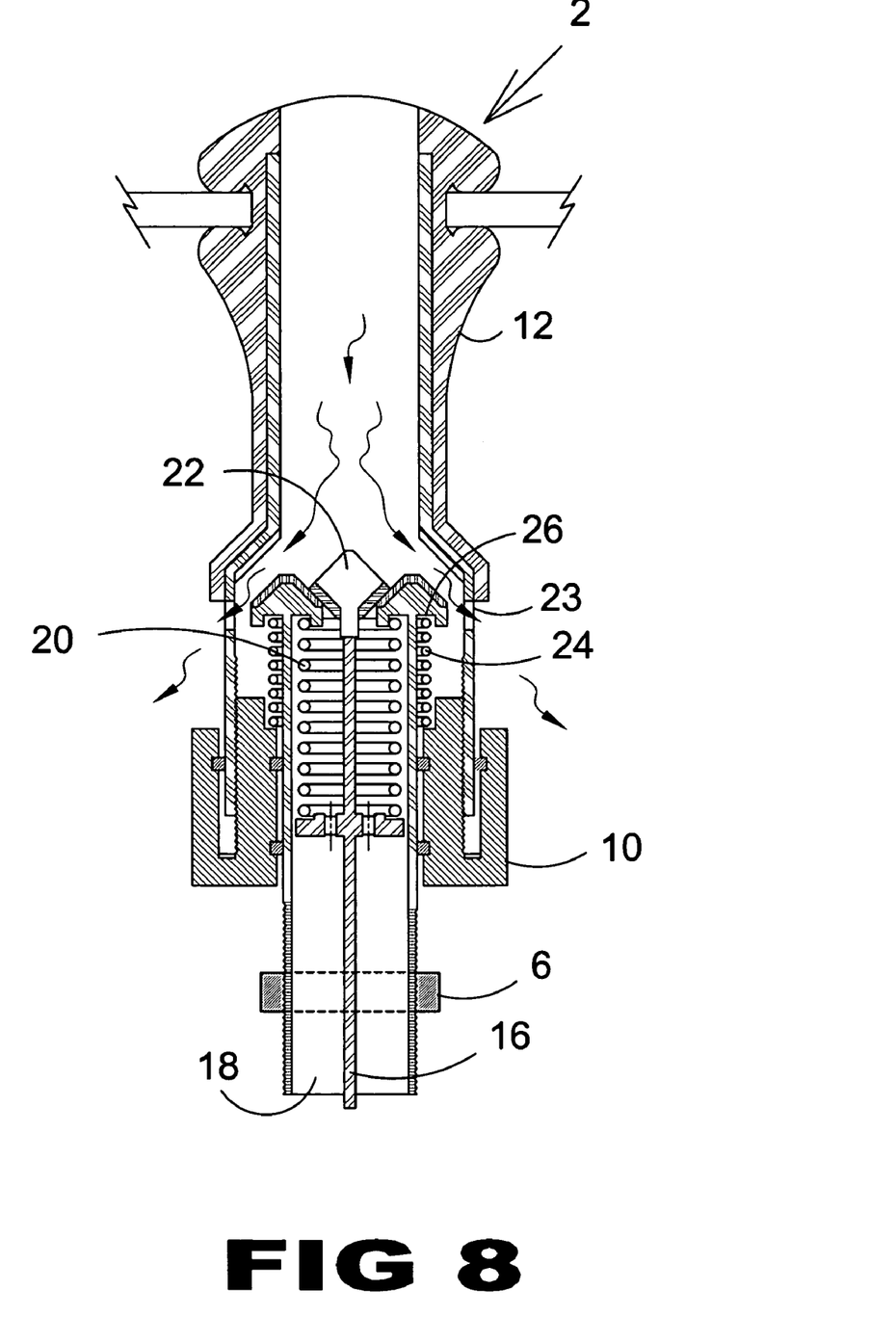
FIG. 8 is a sectional view of the governor valve of the present invention in continued use.

FIG. 8 is a sectional view of the present invention's pressure regulating valve in continued use. The governor valve 2 includes an intake valve and a release valve connected to a valve housing 12. The intake valve includes an intake valve aperture 18 covered by a threadedly attached cap 4. The intake valve further includes an intake valve spring 20 and an intake valve block 22. Preferably, the intake valve includes a source supply trigger pin 16 which pushes the intake valve block 22 against the force of the intake valve spring 20. The force of the intake valve block causes the intake valve spring 20 to be compressed thereby causing the intake valve to be in an open position. Upon the intake valve being in an open position, the closed system is able to receive air, which increases the internal pressure of the closed system. When the source supply trigger pin 16 is released, the intake valve spring 20 forces the intake valve block 22 to return to a closed position, thereby preventing the substance from entering or leaving the closed system 3 and keeping the pressure within the system 3 constant.

The release valve includes release valve apertures 23, a release valve spring 24, and release valve block 26. A setting nut 10 is attached to the valve housing 12 and the regulating means. The regulating means includes the release valve spring 24 and release valve block 26. When the user moves the setting nut 10, the release valve spring 24 is compressed. The release valve spring 24 is calibrated in accordance with the formula:

If F=PA and F=KX, then $P=KX/A$ where

F=force, P=pressure, A=area, which is a constant, K=spring constant, and X=variable setting.

The setting nut 10 indicates the internal pressure of the closed system as shown by the alignment of the setting nut 10 with a graduated scale 14 imprinted on the exterior of the governor valve 2. The release valve spring 24 is calibrated so that if the internal pressure exceeds the desired maximum pressure, the release valve spring 24 causes the release valve block 26 to open. Upon the release valve block 26 being opened, excess pressurized substance escapes from the release valve apertures 23. When the internal pressure is equal to the desired maximum pressure, the release valve spring 24 causes the release valve block 26 to return to the closed position, thereby preventing pressurized substance from escaping through the release valve apertures 23. FIG. 8 shows the release valve in an open position, thereby allowing excess air to escape from the system.

A retainer nut 6 is threadedly attached to the valve housing 12. The retainer nut 6 includes a retainer nut aperture 8 for rotating the retainer nut 6 with a small tool such as an Alan wrench in order to engage the retainer nut 6 with the setting nut 10, thereby retaining the setting nut 10 in a desired position.

Figure 9:
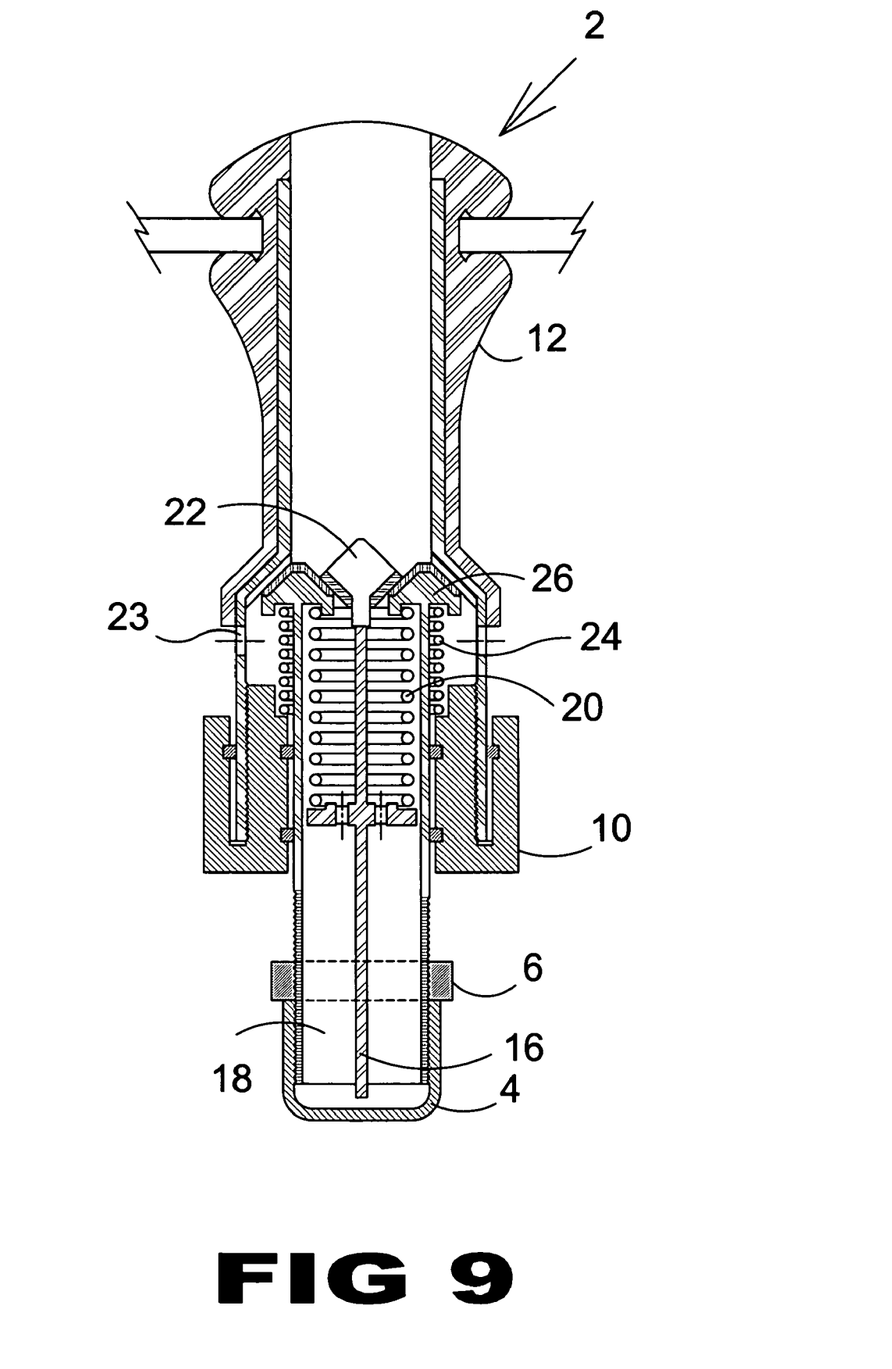
FIG. 9 is a sectional view of the governor valve of the present invention in continued use.

FIG. 9 is a sectional view of the present invention's pressure regulating valve in continued use. The governor valve 2 includes an intake valve and a release valve connected to a valve housing 12. The intake valve includes an intake valve aperture 18 covered by a threadedly attached cap 4. The intake valve further includes an intake valve spring 20 and an intake valve block 22. Preferably, the intake valve includes a source supply trigger pin 16 which pushes the intake valve block 22 against the force of the intake valve spring 20. The force of the intake valve block causes the intake valve spring 20 to be compressed thereby causing the intake valve to be in an open position. Upon the intake valve being in an open position, the closed system is able to receive air, which increases the internal pressure of the closed system. When the source supply trigger pin 16 is released, the intake valve spring 20 forces the intake valve block 22 to return to a closed position, thereby preventing the substance from entering or leaving the closed system 3 and keeping the pressure within the system 3 constant.

The release valve includes release valve apertures 23, a release valve spring 24, and release valve block 26. A setting nut 10 is attached to the valve housing 12 and the regulating means. The regulating means includes the release valve spring 24 and release valve block 26. When the user moves the setting nut 10, the release valve spring 24 is compressed. The release valve spring 24 is calibrated in accordance with the formula:

If F=PA and F=KX, then $P=KX/A$ where

F=force, P=pressure, A=area, which is a constant, K=spring constant, and X=variable setting.

The setting nut 10 indicates the internal pressure of the closed system as shown by the alignment of the setting nut 10 with a graduated scale 14 imprinted on the exterior of the governor valve 2. The release valve spring 24 is calibrated so that if the internal pressure exceeds the desired maximum pressure, the release valve spring 24 causes the release valve block 26 to open. Upon the release valve block 26 being opened, excess pressurized substance escapes from the release valve apertures 23. When the internal pressure is equal to the desired maximum pressure, the release valve spring 24 causes the release valve block 26 to return to the closed position, thereby preventing pressurized substance from escaping through the release valve apertures 23.

A retainer nut 6 is threadedly attached to the valve housing 12. The retainer nut 6 includes a retainer nut aperture 8 for rotating the retainer nut 6 with a small tool such as an Alan wrench in order to engage the retainer nut 6 with the setting nut 10, thereby retaining the setting nut 10 in a desired position.

Figure 10:
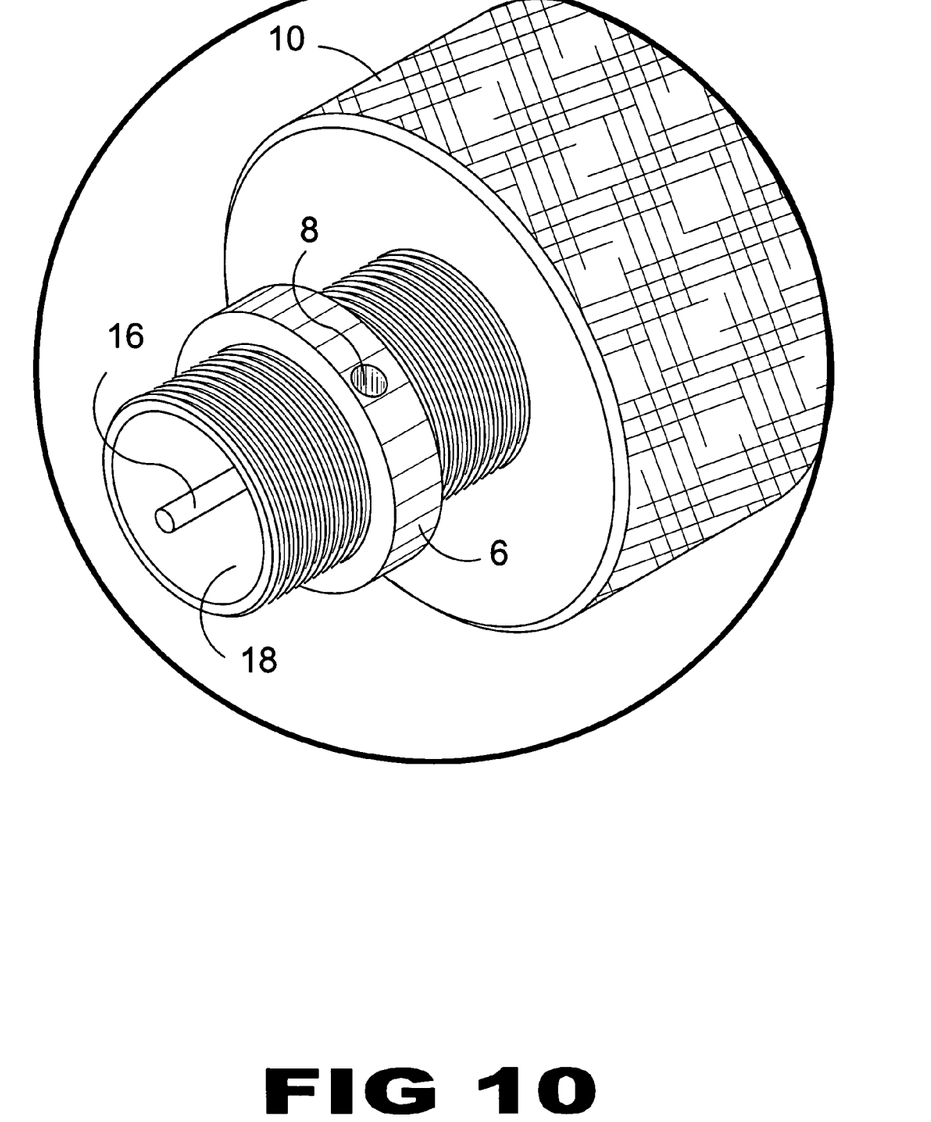
FIG. 10 is an enlarged view of the mounted retainer nut of the intake valve of the present invention.

FIG. 10 is an enlarged view of the intake valve mounted retainer nut. The intake valve includes an intake valve aperture 18 covered by a cap 4, as shown in FIGS. 2–6, which threadedly attaches to the exterior of the intake valve. Preferably, the intake valve includes a source supply trigger pin 16 which opens the intake valve thereby allowing pressurized substance to enter the system. When the source supply trigger pin 16 is released, the intake valve closes, thereby preventing the pressurized substance from entering or leaving the closed system. The setting nut 10 is attached to the valve housing 12 and the regulating means. The setting nut is used to manipulate the regulating means to a desired maximum pressure. The retainer nut 6 is threadedly attached to the valve housing 12. The retainer nut 6 includes a retainer nut aperture 8 for rotating the retainer nut 6 with a small tool such as an Alan wrench in order to engage the retainer nut 6 with the setting nut 10, thereby retaining the setting nut 10 in a desired position.

Figure 11:
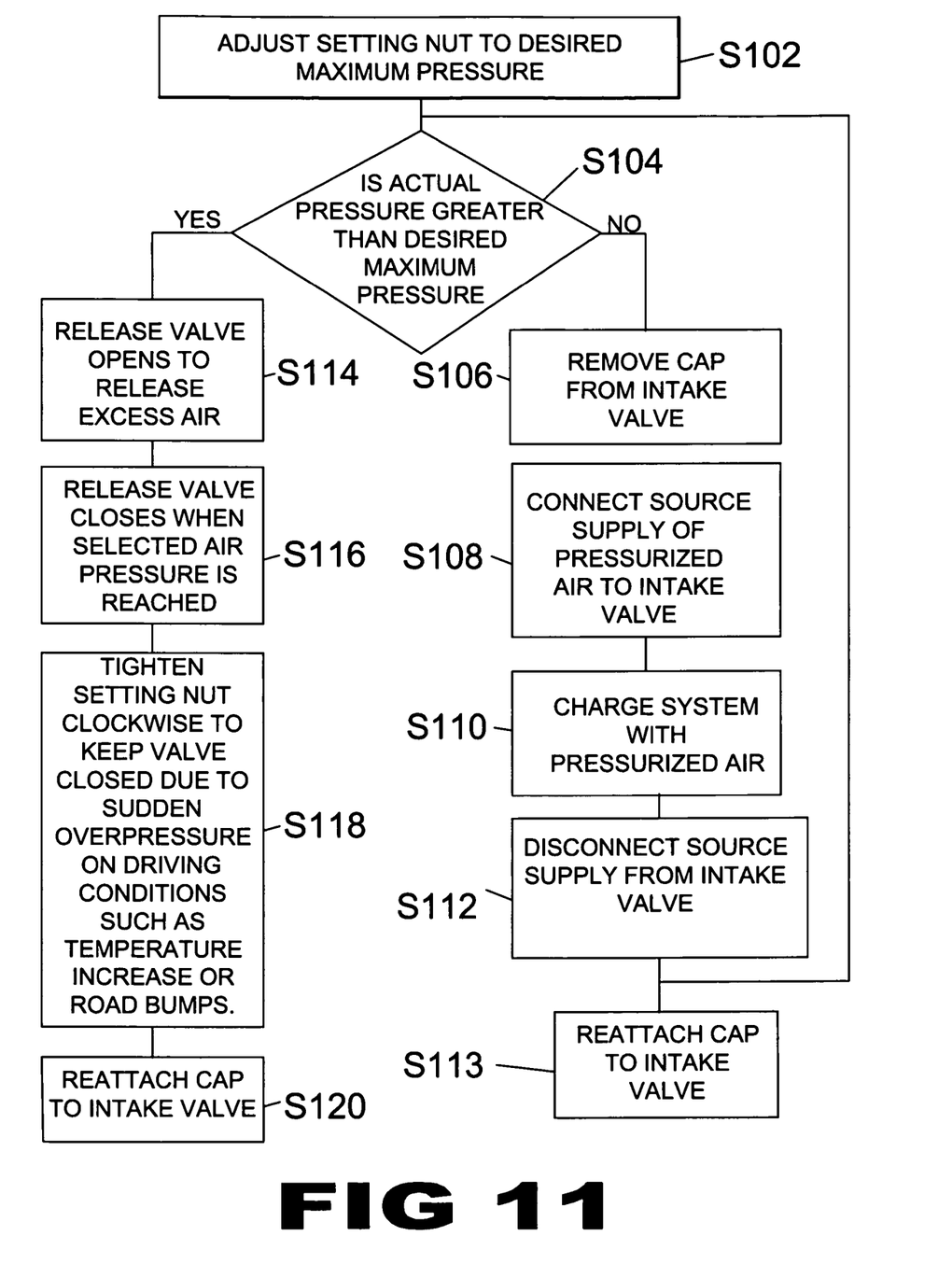
FIG. 11 is a flow diagram of the governor valve of the present invention in use.

FIG. 11 is a flow diagram of the governor valve of the present invention in use on a tire. A user first adjusts the setting nut to the desired maximum pressure, as shown in step S102. The user determines whether the actual pressure is greater or less than the desired maximum pressure, as shown in step S104. If the pressure is not greater than the desired maximum pressure, the user removes the cap from the intake valve, as shown in step S106, and connects a source supply of pressurized air to the intake valve, as in step S108. In accordance with the intake valve mechanism described in the foregoing paragraphs, the user charges the system with pressurized air, as in step S110. The user then disconnects the source supply from the intake valve, as shown in step S112. If the pressure is still less than the desired maximum pressure, the user repeats steps S106 to S112 until the internal pressure is greater than or equal to the desired maximum pressure. When the internal pressure is greater than or equal to the desired maximum pressure, the user reattaches the cap to the intake valve, as shown in step S113. If the internal pressure is greater than the desired maximum pressure, then the release valve opens to release excess air, as shown in step S114. The release valve closes when the desired maximum pressure is reached, as in step S116. When the internal pressure is greater than or equal to the desired maximum pressure, the user tightens the setting nut clockwise to keep the valve closed during sudden pressure changes caused by temperature changes or road conditions, such as bumps, as in step S118 and then reattaches the cap to the intake value, as shown in step S120.

The invention claimed is:

1. An apparatus for regulating the internal pressure of a closed system, comprising:
   a) a valve housing connected to said closed system;
   b) an intake valve connected to said valve housing for receiving a pressurized substance in one direction through said valve housing into the closed system comprising:
      i) an intake valve aperture for receiving pressurized substance from a source supply into the closed system;
      ii) an intake valve block for preventing the escape of pressurized substance from the closed system through said intake valve aperture;
      iii) an intake valve spring for retaining said intake valve block in a closed position; and
      iv) a source supply trigger pin for forcing said intake valve block into an open position thereby allowing pressurized substance to enter the closed system wherein said intake valve spring retains said intake valve block in a closed position;
   c) a release valve connected to said valve housing for releasing excess pressure through said valve housing from the closed system, said release valve comprising:
      i) a release valve aperture in said valve housing for releasing pressurized substance therethrough from a chamber within said valve housing;
      ii) a release valve block positioned within said release valve aperture for selectively preventing said pressurized substance from escaping said valve housing through said release valve aperture, said release valve block having a first seating surface surrounding said intake valve block at about a 45 degree angle with the central axis of said valve housing, said intake valve block being normally seated on said release valve block first seating surface, said release value block having a second seating surface adjacent and about at a right angle to said first seating surface for seating said release valve block being seated normally on a seating surface formed on an inner surface of said valve housing;
      iii) a release valve spring connected to said release valve block for retaining said release valve block in a closed position wherein said release valve spring retains said release valve block in the closed position thereby maintaining a constant internal pressure and upon increasing said constant internal pressure said release valve spring causes said release valve block to move from the closed position to an open position, thereby allowing an excess pressurized substance to enter said chamber surrounding said release valve spring and escape from said release valve aperture, said intake valve block being unseated from said release valve block when pressurized substance is being pumped into said sealed enclosure, and said intake valve block remains seated and moves with said release valve block when said release valve block becomes unseated when pressure within said sealed enclosure is being released, said release valve block having an outer annular recess for seating one end of said release valve spring, an opposite end of said release valve spring restrained by a piston-like member mounted on said source supply trigger pin, an annular space between said piston-like member and said inner surface of said valve housing, and openings through said piston-like member whereby escaping pressurized substance flows through said annular space and openings in said piston-like member when said release valve block is in an open position, and said release valve block having an inner annular recess for seating one end of said intake valve spring; and
   d) a setting nut connected to said valve housing and an opposite end of said release valve spring for selectively compressing said release valve spring for determining a desired pressure level to be maintained within said closed system as expressed by the alignment of said setting nut with graduated indicia etched on the outside of said valve housing, said setting nut covering over some of said graduated indicia during adjustment thereof thereby indicating a selecting setting of maximum pressure.

2. The apparatus as recited in claim 1, wherein said setting nut is adjusted in accordance with the formula $P=X/A$, where area A and spring constant K are constants and variable setting X obtains the pressure P.

3. The apparatus as recited in claim 2, further comprising a retaining nut for retaining said setting nut in a desired position.

4. The apparatus as recited in claim 3, wherein said retaining nut is threadedly attached to said valve housing.

5. The apparatus as recited in claim 4, wherein said intake valve aperture is threadedly covered by a cap.

6. The apparatus as recited in claim 5, wherein said valve housing is connected to a tire.

* * * * *